United States Patent
Kozaki et al.

(10) Patent No.: US 11,617,991 B2
(45) Date of Patent: Apr. 4, 2023

(54) SEPARATION FILM

(71) Applicant: TORAY INDUSTRIES, INC., Tokyo (JP)

(72) Inventors: Yoichiro Kozaki, Shiga (JP); Masakazu Koiwa, Shiga (JP); Fumi Hojo, Shiga (JP); Satoko Kanamori, Shiga (JP); Kentaro Kobayashi, Shiga (JP); Masato Yanagibashi, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/631,250

(22) PCT Filed: Jul. 31, 2020

(86) PCT No.: PCT/JP2020/029513
§ 371 (c)(1),
(2) Date: Jan. 28, 2022

(87) PCT Pub. No.: WO2021/020571
PCT Pub. Date: Feb. 4, 2021

(65) Prior Publication Data
US 2022/0266204 A1    Aug. 25, 2022

(30) Foreign Application Priority Data

Jul. 31, 2019    (JP) .............................. JP2019-141089

(51) Int. Cl.
*B01D 69/02* (2006.01)
*B01D 69/08* (2006.01)
(Continued)

(52) U.S. Cl.
CPC ............. *B01D 69/08* (2013.01); *B01D 69/02* (2013.01); *B01D 71/32* (2013.01); *C12H 1/063* (2013.01);
(Continued)

(58) Field of Classification Search
CPC .... B01D 69/08; B01D 71/32; B01D 2325/02; B01D 2325/36
See application file for complete search history.

(56) References Cited

U.S. PATENT DOCUMENTS

| | | | |
|---|---|---|---|
| 2003/0094409 A1 | 5/2003 | Minegishi et al. |
| 2004/0135274 A1 | 7/2004 | Matsuda |
| 2005/0258101 A1 | 11/2005 | Minegishi et al. |
| 2007/0090051 A1 | 4/2007 | Minegishi et al. |
| 2009/0202876 A1 | 8/2009 | Shimamura et al. |

(Continued)

FOREIGN PATENT DOCUMENTS

| | | |
|---|---|---|
| CN | 102131569 A | 7/2011 |
| CN | 104684633 A | 6/2015 |

(Continued)

OTHER PUBLICATIONS

Korean Office Action for corresponding Korean Application No. 10-2022-7003422, dated Jun. 10, 2022, with English translation.

(Continued)

*Primary Examiner* — Bradley R Spies
(74) *Attorney, Agent, or Firm* — Birch, Stewart, Kolasch & Birch, LLP

(57) ABSTRACT

The present invention relates to a separation membrane including an organic polymer resin, in which a volume V1 of fine pores having a pore diameter of 100 nm or more is 0.3 cm³/g or more and 0.5 cm³/g or less, a volume V2 of fine pores having a pore diameter of less than 100 nm is 0.02 cm³/g or more and less than 0.1 cm³/g, and a ratio V1/V2 of the fine pore volume V1 to the fine pore volume V2 is 3 or more and 60 or less.

5 Claims, 1 Drawing Sheet

(51) Int. Cl.
  *B01D 71/32* (2006.01)
  *C12H 1/07* (2006.01)
(52) U.S. Cl.
  CPC ...... *B01D 2221/06* (2013.01); *B01D 2325/02* (2013.01); *B01D 2325/24* (2013.01); *B01D 2325/30* (2013.01); *B01D 2325/36* (2013.01)

(56) References Cited

U.S. PATENT DOCUMENTS

| | | |
|---|---|---|
| 2011/0155659 A1 | 6/2011 | Yoon et al. |
| 2011/0210067 A1 | 9/2011 | Kato et al. |
| 2011/0226689 A1 | 9/2011 | Komori et al. |
| 2012/0046165 A1 | 2/2012 | Lu et al. |
| 2012/0292250 A1 | 11/2012 | Lu et al. |
| 2015/0328593 A1 | 11/2015 | Kojima |
| 2017/0157572 A1 | 6/2017 | Iwai et al. |
| 2019/0076790 A1 | 3/2019 | Sakakibara et al. |
| 2019/0292288 A1 | 9/2019 | Baba et al. |

FOREIGN PATENT DOCUMENTS

| | | |
|---|---|---|
| JP | 5-57155 A | 3/1993 |
| JP | 11-319522 A | 11/1999 |
| JP | 2008-105016 A | 5/2008 |
| JP | 2013-537484 A | 10/2013 |
| JP | 5732719 B2 | 6/2015 |
| JP | 2015-180185 A | 9/2015 |
| JP | WO2018/025979 A1 | 2/2018 |
| WO | WO 02/058828 A1 | 8/2002 |
| WO | WO 03/031038 A1 | 4/2003 |
| WO | WO 2006/043363 A1 | 4/2006 |
| WO | WO 2010/035793 A1 | 4/2010 |
| WO | WO 2016/006611 A1 | 1/2016 |
| WO | WO 2016/182015 A1 | 11/2016 |
| WO | WO 2017/155034 A1 | 9/2017 |
| WO | WO 2018/056243 A1 | 3/2018 |

OTHER PUBLICATIONS

International Search Report, issued in PCT/JP2020/029513, PCT/ISA/210, dated Oct. 6, 2020.
Notification of Reasons for Refusal for Japanese Application No. 2020-542913, dated Jun. 1, 2021.
Written Opinion of the International Searching Authority, issued in PCT/JP2020/029513, PCT/ISA/237, dated Oct. 6, 2020.
Chinese Office Action and Search Report for corresponding Chinese Application No. 202080055595.4, dated Jun. 10, 2022, with English translation.

SEPARATION FILM

TECHNICAL FIELD

The present invention relates to a separation membrane which is less likely to be clogged during filtration of a fermented liquid such as beer, wine, Japanese rice wine, and soy sauce, and which is excellent in durability against chemical cleaning.

BACKGROUND ART

For the treatment of a fermented liquid in the food field, diatomaceous earth has been commonly used to remove yeast, solids, colloids, and the like in beer and wine after fermentation. However, there has been problems such as the safety of the diatomaceous earth itself and a high cost for disposal due to that the used diatomaceous earth cannot be incinerated and further a large amount of diatomaceous earth is used. Therefore, in recent years, treatment of a fermented liquid using a separation membrane such as an ultrafiltration membrane and a microfiltration membrane, which is excellent in downsizing of devices, has attracted attention.

When a fermented liquid such as beer and wine is treated by a separation membrane module, a layer composed of removed microorganisms, crushed bodies thereof, colloids, and the like is formed on a membrane surface and the membrane is clogged, and thus an increase in filtration pressure and a decrease in filtration rate over time are likely to occur.

As a membrane structure whose membrane surface is less likely to be clogged and which can exhibit filterability, a membrane capable of depth filtration has been developed. The membrane includes pores with a diameter larger than that of a substance to be removed on one side of a separation membrane, has a minimum pore diameter layer on either the other surface or a thick portion, and traps impurities inside the membrane.

Patent Literatures 1 and 2 propose a membrane having an inclined structure in which a pore diameter gradually increases from an outer surface toward an inner surface of a hollow fiber membrane. The membranes disclosed in these Patent Literatures have insufficient water permeability, or have insufficient breaking strength while having high water permeability, and insufficient suppression of clogging.

In relatively recent years, Patent Literatures 3 and 4 disclose a hollow fiber membrane for filtering beer, which contains hydrophilic polymers and has an asymmetric structure. Although the membranes disclosed therein have relatively high filtration performance, the membranes are not economical since cleaning recoverability with a general-purpose chemical such as an aqueous sodium hydroxide solution is insufficient and expensive chemicals are required to obtain high cleaning recoverability.

Patent Literature 5 proposes a hollow fiber membrane that has excellent chemical resistance and has high pure water permeability as well as excellent mechanical breaking strength by heat-treating a separation membrane made of a polyvinylidene fluoride-based resin under a condition of a constant temperature approximate to a melting point of the membrane. However, in the production method disclosed therein, the shrinkage of a solid portion progresses excessively, and fine voids between the solid portions are partially blocked, and thus, a membrane with poor branching of a flow path is obtained. Since the membranes as described above have a feature that a membrane area of a permeable flow path, that is, an effective membrane area, is greatly reduced due to local clogging, the effective membrane area is reduced in an accelerated manner with the progression of filtration in the filtration of a liquid, such as a fermented liquid, in which clogging is likely to progress.

CITATION LIST

Patent Literature

Patent Literature 1: WO 2002/058828
Patent Literature 2: WO 2010/035793
Patent Literature 3: WO 2016/182015
Patent Literature 4: WO 2017/155034
Patent Literature 5: JP-A-2008-105016

SUMMARY OF INVENTION

Technical Problem

In view of the above problems of the prior art, an object of the present invention is to provide a separation membrane in which not only clogging is less likely to occur during filtration of a fermented liquid such as beer, wine, and soy sauce, but also adhesion of flavor components during filtration is reduced, and durability against chemical cleaning is excellent.

Solution to Problem

As a result of intensive studies to achieve the above object, the present inventors have completed the present invention.

The present inventors have conducted filtration of various fermented liquids, and found that fine pores having a pore diameter of less than 100 nm serve as a starting point for adhesion of a contaminant component such as a protein in the fermented liquid, and a layer composed of microorganisms, crushed bodies thereof, a colloid, a complex of the contaminant component, or the like is formed on the adhered contaminant component to cause clogging. Based on this finding, the present inventors have obtained a separation membrane excellent in filterability by setting the volume of fine pores having a pore diameter of less than 100 nm within a certain amount range and setting the volume of fine pores having a pore diameter of 100 nm or more to a certain amount or more.

When the volume of the fine pores having a pore diameter of less than 100 nm is limited, adhesion of flavor components is reduced at the same time. In addition, the present inventors have found that the amount of complication of a contact surface with chemicals at the time of cleaning is small, so that the influence of the surface modification caused by the chemicals on the inside of the membrane structure is small, and the chemical durability is excellent, and have completed the present invention.

That is, the present invention provides the following technique.

(1) A separation membrane including an organic polymer resin,
in which a volume V1 of fine pores having a pore diameter of 100 nm or more is 0.3 $cm^3/g$ or more and 0.5 $cm^3/g$ or less,
a volume V2 of fine pores having a pore diameter of less than 100 nm is 0.02 $cm^3/g$ or more and less than 0.1 $cm^3/g$, and
a ratio V1/V2 of the fine pore volume V1 to the fine pore volume V2 is 3 or more and 60 or less, where V1 is a volume of the fine pores having a pore diameter of 100 nm or more measured by a mercury penetration method, and V2 is a volume of the fine pores having a pore diameter of less than 100 nm measured by a gas adsorption method.

(2) The separation membrane according to (1), in which the ratio V1/V2 is 3 or more and 20 or less.

(3) The separation membrane according to (1) or (2), in which the separation membrane is a hollow fiber membrane having a continuous structure of spherical bodies including a vinylidene fluoride resin.

(4) The separation membrane according to (3), in which the hollow fiber membrane has a breaking elongation of 38% or more.

(5) The separation membrane according to (3) or (4), in which a shrinkage rate of a length of the hollow fiber membrane is 0.5% or more when the hollow fiber membrane is heat-treated in a water vapor atmosphere at 125° C. for 20 hours.

(6) The separation membrane according to any one of (1) to (5), further including a hydrophilic polymer, in which the hydrophilic polymer includes a copolymer including two or more kinds of monomer units, and has a hydration energy density of 40 to 70 cal·mol$^{-1}$·Å$^{-3}$, provided that the hydration energy density is a total hydration energy of monomer species constituting the copolymer per unit volume.

Advantageous Effects of Invention

According to the embodiment of the present invention, it is possible to obtain a separation membrane in which not only clogging is less likely to occur during filtration of a fermented liquid such as beer, wine, and soy sauce, but also adhesion of flavor components during filtration is reduced, and durability against chemical cleaning is excellent.

DESCRIPTION OF EMBODIMENTS

Figure 1:
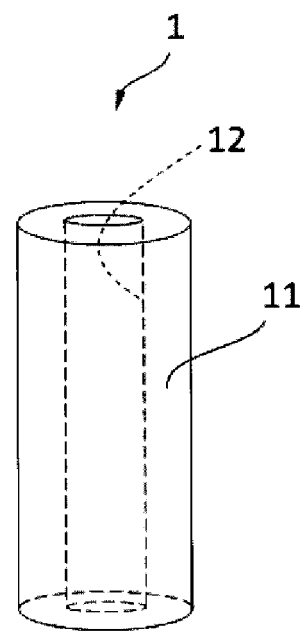
FIG. 1 is a perspective view of a hollow fiber membrane according to an embodiment of the present invention.

Hereinafter, an embodiment of the present invention will be described in detail.
1. Separation Membrane
(1) Organic Polymer Resin In the embodiment of the present invention, the separation membrane includes an organic polymer resin.

Examples of the organic polymer resin include single components such as polyesters such as polytetrafluoroethylene, polyvinylidene fluoride, polylactic acid, polyhydroxyacetic acid, polycaprolactone, and polyethylene adipate, polyurethanes, poly (meth)acrylic acid esters, polyvinyl acetals, polyamides, polystyrenes, polysulfones, cellulose derivatives, polyphenylene ethers, and polycarbonates, polymer alloys or blends of two or more kinds selected from these, and copolymers of monomers forming the polymers. But the organic polymer resin is not limited to these examples.

Among these, examples of the organic polymer resin having excellent heat resistance and chemical resistance include fluorine-based resins such as polytetrafluoroethylene and polyvinylidene fluoride, or sulfone-based resins such as polysulfone and polyether sulfone.

Among these, a vinylidene fluoride resin, which has high compatibility with a solvent and with which a uniform raw liquid for production can be easily prepared, is particularly preferred as the organic polymer resin. The vinylidene fluoride resin refers to a resin containing at least one of a vinylidene fluoride homopolymer and a vinylidene fluoride copolymer. The vinylidene fluoride resin may contain a plurality of kinds of vinylidene fluoride copolymers.

The vinylidene fluoride copolymer is a polymer having a vinylidene fluoride residue structure, and is typically a copolymer of a vinylidene fluoride monomer and another fluorine-based monomer. Examples of such a copolymer include a copolymer of vinylidene fluoride and one or more kinds of monomers selected from vinyl fluoride, tetrafluoroethylene, hexafluoropropylene, and chlorotrifluoroethylene.

The weight average molecular weight of the vinylidene fluoride resin may be appropriately selected depending on the required strength and the water permeability of the separation membrane. The water permeability is deteriorated when the weight average molecular weight is increased, and the strength decreases when the weight average molecular weight is reduced. Therefore, the weight average molecular weight is preferably 50,000 or more and 1,000,000 or less. In the case of a water treatment application in which the separation membrane is exposed to chemical cleaning, the weight average molecular weight is preferably 100,000 or more and 700,000 or less, more preferably 150,000 or more and 600,000 or less.

The separation membrane according to the embodiment of the present invention preferably includes an organic polymer resin as a main component, and the proportion of the organic polymer resin in the separation membrane is preferably 80 wt % or more, more preferably 90 wt % or more, still more preferably 95 wt % or more. Here, the main component refers to a component having the largest content among all components.

The separation membrane preferably includes a vinylidene fluoride resin, among the organic polymer resins, as a main component, and the proportion of the vinylidene fluoride resin in the separation membrane is preferably 80 wt % or more, more preferably 90 wt % or more, still more preferably 95 wt % or more.
(2) Average Pore Diameter In the embodiment of the present invention, the separation membrane is porous. That is, the separation membrane has fine pores therein. The shape of the fine pores is not limited to a specific shape.

The separation membrane has a solid portion formed of an organic polymer resin and having a thickness of 0.5 to 15 μm and voids between the solid portions, and fine voids are also present inside the solid portion.

In the separation membrane according to the embodiment of the present invention, the average pore diameter of the fine pores is preferably 10 to 10,000 nm. The average pore diameter of the fine pores is more preferably within a range of 50 to 5,000 nm, still more preferably within a range of 100 to 3,000 nm. Any of the preferred lower limits can be combined with any of the preferred upper limits.

When the average pore diameter is 10 nm or more, particularly 100 nm or more, the permeation resistance is kept small, and thus the pressure required for filtration is kept low. As a result, for example, in a case where a liquid containing microorganism particles is filtered, it is possible to prevent clogging of membrane surface, a decrease in filtration efficiency, and the like due to destruction or deformation of the microorganism particles. When the average pore diameter is 10,000 nm or less, particularly 3,000 nm or less, sufficient fractionation for the microorganism particles can be obtained.

The average pore diameter can be measured by the mercury penetration method. In the mercury penetration method, a pressure p is applied to mercury so that mercury is injected into communication holes of a separation membrane, and a volume change dV of mercury in a cell relative to an increment dp of the pressure is measured, thereby determining a fine pore distribution function F(r) from the following equation (1).

[Formula 2]

$$F_{(r)} = \frac{p^2}{2\sigma \cos \theta} \times \frac{dV}{dp} \quad (1)$$

(Here, r represents the fine pore radius, σ represents the surface tension of mercury (0.480 N/m), and θ represents the contact angle (140°).) The average pore diameter can be determined by the following equation (2).

[Formula 3]

$$d = \frac{2 \int_0^\infty r \cdot F(r) \, dr}{\int_0^\infty F(r) \, dr} \quad (2)$$

(3) Fine Pore Volume

The fine pores having a pore diameter of less than 100 nm in the separation membrane are mainly voids inside the solid portion, and also include fine voids between the solid portions. The fine pores having a pore diameter of 100 nm or more are large voids between the solid portions.

A small volume of the fine pores having a pore diameter of less than 100 nm means that the volume of voids in the solid portion is small, and that polymer molecules in the organic polymer resin constituting the solid portion are densely arranged. The separation membrane having such a solid portion has high breaking strength and breaking elongation.

The fine pores having a pore diameter of less than 100 nm serve as a starting point for adhesion of contaminant components such as a protein in the fermented liquid, and cause clogging. Therefore, the small volume of the fine pores within the pore diameter range means that the separation membrane has high filterability for the fermented liquid, and further, has a feature in which there is less odor attachment when switching the type of the fermented liquid to be filtered since the adhesion of flavor components is reduced.

In contrast, when the volume of fine pores having a pore diameter of less than 100 nm is extremely small, the flow path in the separation membrane is poor in branching. When the separation membrane is poor in branching of the flow path, the area of the flow path, that is, the effective membrane area is significantly reduced due to the initial clogging of the flow path. When the fine voids between the solid portions disappear due to partial clogging, the volume of the fine pores having a pore diameter of less than 100 nm is often too small.

Here, in the filtration of a liquid, such as a fermented liquid, in which clogging is likely to progress, the effective membrane area of the separation membrane having the above feature is reduced in an accelerated manner with the progress of filtration. Therefore, higher filterability is imparted by remaining a certain amount of fine voids.

In addition, when the volume of the voids between the solid portions, that is, the volume of fine pores having a pore diameter of 100 nm or more is large, high pure water permeability can be obtained. Also the amount of complication of a contact surface with chemicals at the time of cleaning is small, so that the influence of the modification caused by the chemicals on the membrane structure is kept small, and excellent chemical durability is obtained.

On the other hand, when the volume of fine pores having a pore diameter of 100 nm or more is a certain value or less, good mechanical strength can be obtained.

Therefore, the volume of fine pores having a pore diameter of less than 100 nm and the volume of fine pores having a pore diameter of 100 nm or more per unit mass of the separation membrane are controlled to be within a certain range, and a ratio of the volume of fine pores having a pore diameter of less than 100 nm to the volume of fine pores having a pore diameter of 100 nm or more is controlled to be within a certain range, thereby obtaining a separation membrane in which not only clogging is less likely to occur during filtration of a fermented liquid, but also adhesion of a flavor component during filtration is reduced, and durability against chemical cleaning is excellent.

That is, for the separation membrane in which a volume V1 of fine pores having a pore diameter of 100 nm or more is 0.3 cm$^3$/g or more and 0.5 cm$^3$/g or less, and a volume V2 of fine pores having a pore diameter of less than 100 nm is 0.02 cm$^3$/g or more and less than 0.1 cm$^3$/g, and a ratio V1/V2 of the fine pore volume V1 to the fine pore volume V2 is 3 or more and 60 or less, not only clogging is less likely to occur during filtration of the fermented liquid, but also the mechanical strength is excellent, adhesion of a flavor component during filtration is small, and durability against chemical cleaning can also be obtained.

The volume V1 of fine pores having a pore diameter of 100 nm or more is a value measured by the mercury penetration method described above. The volume V2 of fine pores having a pore diameter of less than 100 nm is a value measured by a gas adsorption method. The fine pore volume of pores having a pore diameter of less than 100 nm may be measured by the mercury penetration method, but the gas adsorption method is used to measure the pores having a small pore diameter in terms of the fine pore volume more accurately.

In the gas adsorption method, for example, nitrogen gas adsorption measurement at a liquid nitrogen temperature is performed after water or the like adsorbed to a separation membrane is removed, and a fine pore volume V (cm$^3$/g) of the separation membrane may be measured based on the amount of nitrogen gas adsorbed (in terms of liquid) at a relative pressure (adsorption equilibrium pressure/saturated vapor pressure at a liquid nitrogen temperature) of 0.99.

The volume V1 of fine pores having a pore diameter of 100 nm or more is preferably 0.3 cm$^3$/g or more, more preferably 0.35 cm$^3$/g or more. The volume V1 of fine pores having a pore diameter of 100 nm or more is preferably 0.5 cm$^3$/g or less, more preferably 0.45 cm$^3$/g or less.

The volume V2 of fine pores having a pore diameter of less than 100 nm is preferably 0.020 cm$^3$/g or more, more preferably 0.025 cm$^3$/g or more, still more preferably 0.030 cm$^3$/g or more. The volume V2 of fine pores having a pore diameter of less than 100 25 nm is preferably 0.1 cm$^3$/g or less, more preferably 0.075 cm$^3$/g or less, still more preferably 0.050 cm$^3$/g or less.

The ratio V1/V2 of the fine pore volume V1 to the fine pore volume V2 is preferably 3 or more. In addition. V1/V2 is preferably 60 or less, more preferably 20 or less, still more preferably 15 or less.

Regarding the average pore diameter and the fine pore volume measured by the mercury penetration method, it is preferable that the volume of fine pores having a pore diameter less than the average pore diameter accounts for 60% or more of the volume of the entire fine pores. In such a separation membrane, the flow path is rich in branching, and a load caused by local clogging is dispersed in other flow paths. Therefore, the separation membrane is suitable for filtration of a liquid, such as a fermented liquid, in which clogging is likely to progress.

(4) Spherical Structure

In the separation membrane according to the embodiment of the present invention, the solid portion preferably has a spherical structure. The spherical structure is a structure in which spherical bodies are continuous. When such a structure is provided inside the separation membrane, the voids between the solid portions (spherical bodies) are less likely to shrink, and high pure water permeability can be maintained. High strength and high water permeability can be achieved with the spherical structure, as compared with the network structure in the related art.

The spherical structure preferably includes a vinylidene fluoride resin, and it is preferable that the separation membrane has a spherical structure and is a hollow fiber membrane. A part of the hollow fiber membrane is shown in FIG. 1. When the separation membrane is a hollow fiber membrane 1 shown in FIG. 1, the inside of the separation membrane refers to a portion excluding an outer surface 11, that is, the substantial inside of the hollow fiber membrane 1 and/or an inner surface 12.

Figure 2:
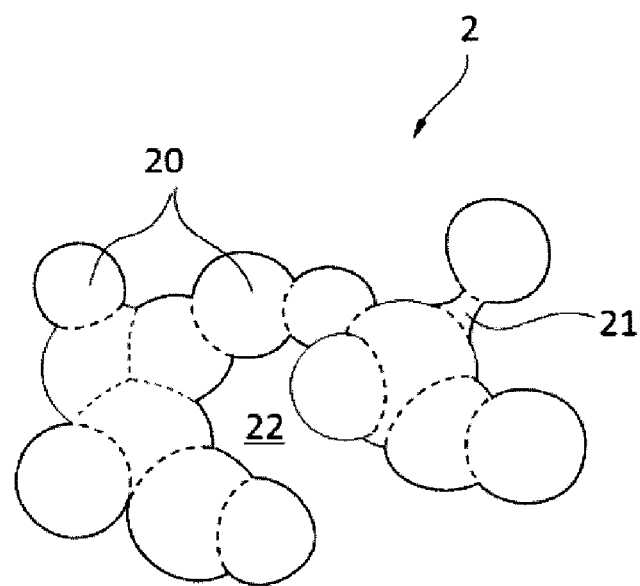
FIG. 2 is a perspective view of a spherical structure according to an embodiment of the present invention.

A part of the spherical structure is schematically shown in FIG. 2. In a spherical structure 2 of FIG. 2, a plurality of spherical bodies 20 are connected.

The spherical body 20 is a substantially spherical body or a substantially elliptical body. As shown in FIG. 2, a spherical body 20 is connected to another spherical body 20, so that the entire spherical surface or ellipsoidal surface of the spherical body 20 cannot be observed. However, the diameter, the major axis diameter, and the minor axis diameter of the spherical body can be estimated from the shape appearing in the outer shape.

The connection between the spherical bodies may be formed by directly bonding the spherical bodies to each other, or may be formed by a non-spherical portion (also referred to as a neck) 21 between the spherical bodies.

A void 22 between the spherical bodies is the void between the solid portions described above. As described above regarding the solid portion, fine voids are also present in the spherical body.

The average diameter of the spherical body is within a range of 0.5 to 15 μm, preferably within a range of 0.6 to 10 μm, more preferably within a range of 0.8 to 8 μm.

The diameter of the spherical body is determined by taking a photograph of a cross section and/or an inner surface of the hollow fiber membrane at a magnification at which the spherical structure can be clearly confirmed, by using a scanning electron microscope or the like, measuring the diameters of 10 or more, preferably 20 or more arbitrary spherical bodies, and averaging the measured diameters. It is also preferable to analyze the photograph with an image processing apparatus and determine an average value of the equivalent circle diameters. The density of the spherical bodies is preferably within a range of $10^3$ to $10^8$ piece/mm$^2$, more preferably within a range of $10^4$ to $10^6$ piece/mm$^2$. When the density of the spherical bodies is $10^3$ piece/mm$^2$ or more, high strength required for the fermented liquid treatment can be achieved, and when the density is $10^8$ piece/mm$^2$ or less, high pure water permeability can be obtained.

As for the density of the spherical bodies, a photograph is taken in the same manner as in the measurement of the diameter, and the number of the spherical bodies per unit area is measured. The circularity (minor axis diameter/major axis diameter) is preferably 0.5 or more, more preferably 0.6 or more, still more preferably 0.7 or more.

(5) Hydrophilic Polymer

The separation membrane according to the embodiment of the present invention preferably includes a hydrophilic polymer. The hydrophilic polymer preferably includes a copolymer composed of two or more kinds of monomer units, and the hydration energy density of the hydrophilic polymer is preferably 40 to 70 cal·mol$^{-1}$·Å$^{-3}$, provided that the hydration energy density is a total hydration energy of monomer species constituting the copolymer per unit volume.

The monomer unit refers to a repeating unit in a homopolymer or copolymer obtained by polymerizing monomers. For example, the hydrophobic monomer unit refers to a repeating unit in a homopolymer or copolymer obtained by polymerizing hydrophobic monomers. The monomer unit i refers to any one of two or more kinds of monomer units. For example, the vinyl pyrrolidone/vinyl decanoate random copolymer contains two kinds of monomer units, i.e., vinyl pyrrolidone and vinyl decanoate.

The hydration energy refers to an energy change obtained in a system when a solute is put into an aqueous solution.

The hydration energy of the monomer unit refers to an absolute value of a value obtained by subtracting the energy of the monomer unit in vacuum from the energy of the monomer unit in water.

The hydration energy density refers to hydration energy per unit volume.

When the hydration energy density of the hydrophilic polymer is 40 to 70 cal·mol$^{-1}$·Å$^{-3}$, the electrostatic interaction or the hydrophobic interaction between the hydrophilic polymer present on the surface of the hollow fiber membrane and the impurities in the fermented liquid is reduced, and adhesion of the impurities in the fermented liquid to the hollow fiber membrane is prevented.

The hydration energy density of the hydrophilic polymer is preferably 43 to 60 cal·mol$^{-1}$·Å$^{-3}$, more preferably 45 to 55 cal·mol$^{-1}$·Å$^{-3}$. Any of the preferred lower limits can be combined with any of the preferred upper limits.

In a case where the hollow fiber membrane according to the embodiment of the present invention includes a hydrophilic polymer, a content of the hydrophilic polymer is preferably 0.001 mass % or more and 30 mass % or less. The content is more preferably 0.005 mass % or more and 10 mass % or less, still more preferably 0.01 mass % or more and 1 mass % or less. In a case where the content of the hydrophilic polymer is less than 0.001 mass %, the effect of preventing clogging during filtration is small, and the recoverability of the membrane performance by washing is also small. In a case where the content is more than 30 mass %, the flow path is narrowed by the hydrophilic polymer, and the permeability of the liquid is lowered.

The content of the hydrophilic polymer can be quantified by X-ray electron spectroscopy (XPS), total reflection infrared spectroscopy (ATR-IR), proton nuclear magnetic resonance spectroscopy ($^1$H-NMR), or the like.

(6) Others

When the separation membrane according to the embodiment of the present invention has a shape of the hollow fiber membrane, the outer diameter and the membrane thickness of the hollow fiber membrane may be determined in consideration of the pressure loss in a longitudinal direction of the inside of the hollow fiber membrane to the extent that the strength of the membrane is not impaired, so that the water permeation amount of the membrane module reaches a target value. That is, if the outer diameter is large, it is advantageous in terms of pressure loss, but the number of fillings is reduced, which is disadvantageous in terms of the membrane area.

On the other hand, the number of fillings is increased in a case where the outer diameter is small, so that it is advantageous in terms of the membrane area, but it is disadvantageous in terms of the pressure loss. In addition, the membrane thickness is preferably as small as possible within a range in which the strength is not impaired. Therefore, for an approximate indication, the outer diameter of the hollow fiber membrane is preferably 0.3 to 3 mm, more preferably 0.4 to 2.5 mm, still more preferably 0.5 to 2.0 mm. The membrane thickness is preferably 0.08 to 0.4 times, more preferably 0.1 to 0.35 times, still more preferably 0.12 to 0.3 times the outer diameter. Any of the preferred lower limits can be combined with any of the preferred upper limits.

It is preferable that the separation membrane according to the embodiment of the present invention has substantially no macrovoids. Here, the macrovoids are pores having a major axis diameter of 50 μm or more observed in a substantial portion of the membrane in the cross section of the separation membrane. The description "have substantially no" means that the number of the macrovoids is 10 piece/mm$^2$ or less, more preferably 5 piece/mm$^2$ or less in a cross section, and it is most preferable that the macrovoids are not present at all.

The water permeability of the separation membrane according to the embodiment of the present invention at 10 kPa and 25° C. is preferably within a range of 0.1 to 10 m$^3$/m$^2$·h, more preferably within a range of 0.2 to 5 m$^3$/m$^2$·h, still more preferably within a range of 0.4 to 2 m$^3$/m$^2$·h. Any of the preferred lower limits can be combined with any of the preferred upper limits.

In a case where the separation membrane according to the embodiment of the present invention is a hollow fiber membrane, the breaking strength of the hollow fiber membrane is preferably within a range of 0.3 to 3 kg/piece, more preferably within a range of 0.4 to 2.5 kg/piece, still more preferably within a range of 0.5 to 1.5 kg/piece.

In a case where the separation membrane according to the embodiment of the present invention is a hollow fiber membrane, the breaking elongation of the hollow fiber membrane is preferably within a range of 20% to 1000%, more preferably within a range of 30% to 100%. In the filtration of the fermented liquid, a cross-flow filtration in which a stronger stress is applied is preferably employed, and thus, the breaking elongation is more preferably 38% or more, and is preferably within a range of 38% to 100%. Any of the preferred lower limits can be combined with any of the preferred upper limits. The breaking strength and the breaking elongation of the hollow fiber membrane preferably satisfy the above ranges respectively at the same time.

A value of maximum point stress (gf/mm$^2$)/breaking elongation (%) is preferably 7 to 50 (gf/%/mm$^2$). A preferred breaking elongation is achieved while maintaining excellent water permeability.

2. Method for Producing Separation Membrane

Next, among the separation membranes according to the embodiment of the present invention, a method for obtaining a hollow fiber membrane from a vinylidene fluoride resin will be described in particular, but the present invention is not limited to these production method examples.

Examples of the method for producing a hollow fiber membrane from a vinylidene fluoride resin include a thermally induced phase separation method, a nonsolvent induced phase separation method, a melting extraction method, and a stretching pore formation method. Among them, it is preferable to use the thermally induced phase separation method or the nonsolvent induced phase separation method.

The thermally induced phase separation refers to phase separation for solidifying a resin by cooling a resin solution melted at a high temperature, and the nonsolvent induced phase separation refers to phase separation for solidifying a resin by bringing a resin solution into contact with a nonsolvent.

In a case where the separation membrane is produced using the thermally induced phase separation method, a solvent of the vinylidene fluoride resin solution is preferably a poor solvent for the resin, particularly preferably a poor solvent in which the solubility of resins is relatively high, such as alkyl ketones and esters, for example, cyclohexanone, isophorone, γ-butyrolactone, and dimethyl sulfoxide.

In a case where the separation membrane is produced using the nonsolvent induced phase separation method, the solvent of the vinylidene fluoride resin solution is preferably a good solvent for the resin. Examples of the good solvent include lower alkyl ketones, esters, and amides such as N-methyl-2-pyrrolidone, dimethylacetamide, dimethylformamide, methylethylketone, acetone, tetrahydrofuran, and mixed solvents thereof.

On the other hand, the non-solvent is a non-solvent of a resin, and examples thereof include water, aliphatic hydrocarbons, aromatic hydrocarbons, aliphatic polyhydric alcohols, aromatic polyhydric alcohols, chlorinated hydrocarbons such as hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, and low molecular weight polyethylene glycol, and other chlorinated organic liquids and mixed solvents thereof.

In the thermally induced phase separation method and the nonsolvent induced phase separation method, a good solvent or a poor solvent in which the solubility of a resin is high is used to allow the resin and the solvent to be mixed with each other at a molecular level, so that solvent molecules are interposed between the molecules of the resin when the resin is solidified. For this reason, the number of voids between molecules to be formed is increased. Therefore, in order to control the volume of the fine pores to be within the fine pore volume range excellent in the filterability of the fermented liquid, it is preferable to perform a post-treatment for reducing the number of the voids between molecules in the separation membrane obtained by the phase separation method.

As the post-treatment for reducing the number of voids between molecules, a solvent immersion treatment is preferred in which the separation membrane is immersed in a poor solvent, in which the solubility of the vinylidene fluoride resin is relatively high, at a constant temperature for a short period of time, and substitution is performed with a nonsolvent of the vinylidene fluoride resin in a state in which only an outer surface structure of the solid portion is dissolved. In the solvent immersion treatment, it is considered that the voids between the solid portions are hardly affected while the voids in the solid portions are blocked, and a fine pore structure suitable for the filtration of a liquid, such as a fermented liquid, in which clogging is likely to occur, is formed.

On the other hand, when the separation membrane is heat-treated at a high temperature approximate to the melting point Tm of the separation membrane obtained by the thermally induced phase separation method or the nonsolvent induced phase separation method, the micro-Brownian movement of the polymers is activated in the amorphous portion inside the solid portions forming the separation membrane, and then a part of the polymers is crystallized, or a crystal portion inside the solid portions that melts at a temperature lower than the melting point of the separation membrane melts once and then recrystallizes into a crystal portion that melts at a higher temperature. Accordingly, the solid portions shrink. Since micro voids are present in the crystal portion and the amorphous portion, the voids are filled by the shrinkage. Accordingly, an effect of reducing the number of the starting points for adhesion of contaminant components such as a protein in the fermented liquid is expected.

However, it is considered that an effect of causing a poor branch of the flow path is generated since the micro voids between the solid portions are blocked due to the shrinkage of the entire membrane during the heat treatment. Accordingly, the separation membrane is not suitable for filtration of a liquid, such as a fermented liquid, in which clogging is likely to occur. Examples of a method for quantifying the micro voids between the solid portions include a method for measuring a shrinkage rate of a hollow fiber membrane that is heat-treated at a temperature T satisfying a relationship of $Tm-60°\,C.\leq T<Tm-40°\,C$. in which Tm represents a melting point of the separation membrane.

Here, the melting point Tm of the separation membrane is the temperature of a peak top when a separation membrane in a dry state is heated at a temperature raised at a rate of 10° C./min using a differential scanning calorimetry (DSC measurement) apparatus, and is approximate to 175° C. in the case of a hollow fiber membrane made of polyvinylidene fluoride. In the case of a hollow fiber membrane made of vinylidene fluoride resin, sufficient amount of micro voids are present between the solid portions when a shrinkage rate of the length of a hollow fiber membrane is 0.5% or more after being heat-treated in a water vapor atmosphere at 125° C. for 20 hours. The shrinkage rate is more preferably 1.0% or more, still more preferably 2.0% or more. On the other hand, the shrinkage rate is preferably 25% or less since the excessive thermal shrinkage induces fiber breakage and deformation inside the module.

The thermally induced phase separation method mainly includes two kinds of phase separation mechanisms. One is a liquid-liquid phase separation method in which a resin solution in which a resin is uniformly dissolved at a high temperature is separated into a concentrated phase and a dilute phase of a resin due to a decrease in dissolution ability of the solution at the time of temperature decrease. The other one is a solid-liquid phase separation method in which a resin solution in which a resin is uniformly dissolved at a high temperature is phase-separated into a polymer solid phase and a polymer dilute solution phase due to crystallization of the resin at the time of temperature decrease.

A three-dimensional network structure is mainly formed in the former method, and a spherical structure is formed in the latter method. In the present invention, it is more preferable to form a spherical structure by the latter phase separation mechanism for the reasons described above. According to this phase separation mechanism, a spherical structure, which includes a spherical crystal (spherical body) including a lamellar structure and a polymer chain that connects one lamellar structure to another lamellar structure, is formed. The reason for the spherical structure being preferred also lies in that the voids between the solid portions hardly shrink and high pure water permeability can be maintained since the solid portions are bulky in the case of the spherical structure. For this reason, it is preferable to select a resin concentration and a solvent that induce the solid-liquid phase separation. In addition, it is preferable to use a cooling bath at the time of performing cooling, and it is preferable to use a solvent the same as the solvent of the resin solution, or contain a nonsolvent of the resin at a low concentration in order to accelerate the solidification.

For the reasons described above, as the method for producing the separation membrane according to the embodiment of the present invention, a solid-liquid phase separation method in the thermally induced phase separation method is more preferably employed in order to form a spherical structure, and the obtained separation membrane is preferably subjected to a solvent immersion treatment.

Here, in a case where the separation membrane according to the embodiment of the present invention has the shape of a hollow fiber membrane, a hollow fiber membrane produced by using the nonsolvent induced phase separation method or the thermally induced phase separation method is preferably stretched before the solvent immersion treatment or the heat treatment in order to expand the voids and improve the pure water permeability. As for the stretching conditions, a temperature range is preferably 50 to 120° C., more preferably 60 to 100° C., and a stretching ratio is preferably 1.1 to 4 times.

When the temperature is lower than 50° C. it is difficult to stretch stably and uniformly. When the temperature is higher than 120° C., the hollow fiber membrane may be softened and the hollow portions may be crushed. The stretching is preferably performed in a liquid since temperature control is easy, and may be performed in a gas such as steam. As the liquid, water is preferred since it is simple, and in the case of performing stretching at about 90° C. or higher, it is also preferable to use polyethylene glycol having a low molecular weight.

In particular, when a hollow fiber membrane having a spherical structure is obtained from a vinylidene fluoride resin by thermally induced phase separation, the breaking strength and the breaking elongation have a linear positive correlation with the phase separation temperature, and both parameters have a negative correlation inversely proportional to the water permeability. By subjecting such a hollow fiber membrane to a post-treatment such as heating, immersion in a solvent, and stretching treatment, excellent water permeability, excellent breaking strength, and excellent breaking elongation can be achieved.

EXAMPLE

Hereinafter, the present invention will be described in more detail with reference to Examples, but the present invention is not limited to these Examples.

In the following Examples, a case where the separation membrane of the present invention has the shape of the hollow fiber membrane will be described.

(Melting Point Tm of Hollow Fiber Membranes)

Using a differential scanning calorimeter (DSC-6200) manufactured by Seiko Instruments Inc., a hollow fiber membrane in a dry state was sealed in a sealed DSC vessel, and a peak top temperature of a peak observed in a process of raising the temperature at a temperature rising rate of 10° C./min was defined as the melting point Tm of the hollow fiber membrane.

(Measurement of Fine Pore Diameter Distribution of Hollow Fiber Membrane by Mercury Penetration Method)

A hollow fiber membrane was completely dried by the following method. The hollow fiber membrane, which was not heat-treated and was wet with water, was freeze-dried at −20° C. for about 50 hours and then vacuum-dried at room temperature for about 8 hours. The heat-treated hollow fiber membrane was vacuum-dried at room temperature for about 8 hours. This completely dried hollow fiber membrane was cut into a sample having a length of about 5 mm, and the weight of the sample was measured by an electronic balance (AW220, manufactured by Shimadzu Corporation). The fine pore diameter distribution was measured by PORE SIZER 9320 manufactured by Micromeritics Corporation. A test piece was sealed in a glass cell of about 5 cm$^3$ attached to the apparatus, mercury was injected under reduced pressure, and then the pressure was increased within a range of about 4 kPa to 207 MPa (corresponding to a fine pore diameter of about 7 nm to 350 μm) via oil in a pressure resistant vessel attached to the apparatus, thereby performing the measurement. The calculation was carried out under a condition that the surface tension of mercury was 484 dyn/cm, and the contact angle of mercury was 141.3°. The volume of fine pores having a pore diameter of 100 nm or more was defined as V1.

(Measurement of Fine Pore Volume of Hollow Fiber Membrane by Gas Adsorption Method)

The hollow fiber membrane dried under reduced pressure was cut into a sample having a length of about 10 cm, and the weight of the sample was measured by an electronic balance (AW220, manufactured by Shimadzu Corporation). The nitrogen gas adsorption amount was measured using an automatic specific surface area and fine pore diameter distribution analyzer (BELSORP-mini II, manufactured by MicrotracBEL Corporation). The BET specific surface area was calculated using an attached analysis program. The volume of fine pores having a pore diameter of less than 100 nm was defined as V2.

(Preparation of Module)

A plurality of hollow fiber membranes were cut in a length of about 30 cm and wound with a polyethylene film to form a hollow fiber membrane bundle. The hollow fiber membrane bundle was inserted into a cylindrical module case made of polycarbonate, and both ends of the hollow fiber membrane bundle were solidified with an epoxy potting agent. The end portions were cut to obtain a module having both end portions opened. The number of the hollow fiber membranes was appropriately set such that the membrane area based on the inner diameter of the hollow fiber membranes was 100 to 200 cm$^2$. The cylindrical module case was provided with ports at two locations near both end portions so that the fluid could perfuse the outer surface of the hollow fiber membranes, and end caps having liquid inlet/outlet ports were mounted on both ends so that the fluid could perfuse the hollow portions of the hollow fiber membranes.

(Shrinkage Rate During Sterilization)

The hollow fiber membrane was sterilized by the following method. The hollow fiber membrane was cut in a length of 40 cm, and sterilized for 20 hours at a set temperature of 125° C. using an autoclave apparatus (LSX-300, manufactured by Tomy Seiko Co., Ltd.). The length of the hollow fiber membrane after sterilization was measured, and the shrinkage length was divided by the length of the hollow fiber membrane before sterilization, thereby calculating the shrinkage rate.

(Measurement of Maximum Point Stress and Breaking Elongation)

Using a tensile tester (TENSILON/RTM100, manufactured by Toyo Baldwin Co., Ltd.), measurement was performed at a crosshead speed of 50 mm/min under a load of 5 kg in full scale. A test piece having a test length of 50 mm was used for measurement in a wet state.

(Measurement of Beer Permeability)

A commercially available non-filtered beer "Ginga Kogen Beer" containing beer yeast was used (hereinafter, referred to as "evaluation beer"). After the module was filled with RO water and allowed to stand for 1 hour or more, the RO water outside the hollow fiber membrane was discharged, and then, the water present in the hollow portion was replaced with the evaluation beer. A circuit was constructed in such a manner that 2 L of the evaluation beer maintained at 0° C. was prepared in a vessel, and the evaluation beer perfuses the outer surface of the hollow fiber membrane from the vessel via a pump and returned to the vessel, and at the same time, the filtrate filtered by the hollow fiber membrane was collected in a vessel different from the vessel containing the evaluation beer. At this time, the inlet pressure and the outlet pressure of the evaluation beer to the module and the pressure on the filtration side were measured. The evaluation beer was introduced such that the evaluation beer flowed through the module inlet at a flow rate of 1.5 m/sec. The filtration rate was adjusted to 100 L/m$^2$/h. In this state, cross-flow filtration in which the outer surface of the hollow fiber membrane was perfused with the evaluation beer at 5±3° C. and a part of the evaluation beer was filtered was continuously performed. The inlet pressure, the outlet pressure, and the pressure on the filtration side were measured at predetermined time intervals, and the time [h] during which the pressure difference between membranes (TMP) increased to 100 kPa was measured to calculate the beer treatment amount.

It was defined that TMP=(Pi+Po)/2−Pf.

Here, Pi represents the inlet pressure, Po represents the outlet pressure, and Pf represents the pressure on the filtration side.

It was defined that the beer treatment amount [L/m$^2$] =filtration rate 100 [L/m$^2$/h]×time [h] during which the pressure is increased to TMP of 100 kPa.

Reference Example 1

A vinylidene fluoride homopolymer having a weight average molecular weight of 417,000 in an amount of 28 wt % was dissolved in dimethyl sulfoxide in an amount of 72 wt % at 120° C. The vinylidene fluoride homopolymer solution was discharged from an outer tube of a double-tube type spinneret, and at the same time, an aqueous solution containing 90 wt % of dimethyl sulfoxide was discharged from an inner tube of the double-tube type spinneret to solidify the vinylidene fluoride homopolymer in a bath of an aqueous solution containing 85 wt % of dimethyl sulfoxide at a temperature of 10° C., and then the solidified product was washed with water and stretched 1.4 times in water at 90° C. The resulting hollow fiber membrane had a melting point of 170° C. and had a spherical structure.

Reference Example 2

A vinylidene fluoride homopolymer having a weight average molecular weight of 417,000 in an amount of 38 wt % was dissolved in γ-butyrolactone in an amount of 62 wt % at 150° C. The vinylidene fluoride homopolymer solution was discharged from an outer tube of a double-tube type spinneret, and at the same time, an aqueous solution containing 85 wt % of γ-butyrolactone was discharged from an inner tube of the double-tube type spinneret to solidify the vinylidene fluoride homopolymer in a bath of an aqueous solution containing 85 wt % of γ-butyrolactone at a temperature of 9° C., and then the solidified product was washed with water and stretched 1.5 times in water at 85° C. The resulting hollow fiber membrane had a melting point of 173° C. and had a spherical structure.

Example 1

After the preparation in Reference Example 1, the hollow fiber membrane was immersed in methyl sulfoxide at 10° C. for 15 minutes, and the poor solvent was replaced with water. The performance of the resulting hollow fiber membrane is shown in Table 1.

Example 2

After the preparation in Reference Example 2, the hollow fiber membrane was immersed in an aqueous solution containing 50 w % of γ-butyrolactone at 50° C. for 60 minutes, and the poor solvent was replaced with water. The performance of the resulting hollow fiber membrane is shown in Table 1.

Example 3

After the preparation in Reference Example 2, the hollow fiber membrane was immersed in γ-butyrolactone at 25° C. for 60 minutes, and the poor solvent was replaced with water. The performance of the resulting hollow fiber membrane is shown in Table 1.

Comparative Example 1

The performance of a hollow fiber membrane obtained in the same manner as in Example 2 except that the poor solvent immersion treatment was not performed is shown in Table 1.

Comparative Example 2

After the preparation in Reference Example 2, the hollow fiber membrane was immersed in γ-butyrolactone at 70° C. for 60 minutes, and the poor solvent was replaced with water. The fine pores of the hollow fiber membrane were completely blocked by dissolution.

Comparative Example 3

After the preparation in Reference Example 2, the hollow fiber membrane was immersed in an aqueous solution containing 70 wt % of γ-butyrolactone at 90° C. for 60 minutes, and the poor solvent was replaced with water. The fine pores of the hollow fiber membrane were completely blocked by dissolution.

Comparative Example 4

After the preparation in Reference Example 2, the hollow fiber membrane was immersed in hot water at 90° C. for 60 minutes. The performance of the resulting hollow fiber membrane is shown in Table 1.

Comparative Example 5

The air-dried hollow fiber membrane was heat-treated at 140° C. for 60 minutes. The performance of the resulting hollow fiber membrane is shown in Table 1.

TABLE 1

| | V1 (cm$^3$/g) | V2 (cm$^3$/g) | V1/V2 | Shrinkage rate during sterilization (%) | Maximum point stress (gf/mm$^2$) | Breaking Elongation (%) | Maximum point stress/breaking elongation | Beer treatment amount (L/m$^2$) |
|---|---|---|---|---|---|---|---|---|
| Example 1 | 0.310 | 0.030 | 10.3 | 5.1 | 1730 | 50 | 35 | 500 |
| Example 2 | 0.370 | 0.043 | 8.6 | 2.2 | 1800 | 41 | 44 | 590 |
| Example 3 | 0.370 | 0.026 | 14.4 | 1.0 | 1980 | 89 | 22 | 330 |
| Comparative Example 1 | 0.229 | 0.213 | 1.1 | 20.8 | 1430 | 38 | 38 | 182 |
| Comparative Example 4 | 0.245 | 0.197 | 1.2 | 19.0 | 1510 | 37 | 41 | 139 |
| Comparative Example 5 | 0.450 | 0.005 | 90.0 | 0.3 | 1950 | 35 | 56 | 208 |

As can be seen from the above results, the separation membranes of Examples were improved in the filtration performance and the beer treatment amount when the volume V1 of fine pores having a pore diameter of 100 nm or more, the volume V2 of fine pores having a pore diameter of less than 100 nm, and the ratio thereof were within the specific ranges. In addition, it was found that the durability was also excellent.

The present application is based on the Japanese Patent Application No. 2019-141089 filed on Jul. 31, 2019, contents of which are incorporated herein by reference.

INDUSTRIAL APPLICABILITY

The separation membrane produced according to the method of the present invention has very high chemical durability and physical durability, and has excellent filterability relative to a fermented liquid, and thus is useful as a separation membrane used in filtration of the fermented liquid.

The invention claimed is:

1. A separation membrane comprising an organic polymer resin,
   wherein a volume V1 of fine pores having a pore diameter of 100 nm or more is 0.3 cm³/g or more and 0.5 cm³/g or less,
   wherein a volume V2 of fine pores having a pore diameter of less than 100 nm is 0.02 cm³/g or more and less than 0.1 cm³/g, and
   wherein a ratio V1/V2 of the fine pore volume V1 to the fine pore volume V2 is 3 or more and 60 or less,
   wherein V1 is a volume of the fine pores having a pore diameter of 100 nm or more measured by a mercury penetration method,
   wherein V2 is a volume of the fine pores having a pore diameter of less than 100 nm measured by a gas adsorption method, and
   wherein the separation membrane is a hollow fiber membrane consisting of a continuous structure of spherical bodies comprising a vinylidene fluoride resin.

2. The separation membrane according to claim 1, wherein the ratio V1/V2 is 3 or more and 20 or less.

3. The separation membrane according to claim 1, wherein the hollow fiber membrane has a breaking elongation of 38% or more.

4. The separation membrane according to claim 3, wherein a shrinkage rate of a length of the hollow fiber membrane is 0.5% or more when the hollow fiber membrane is heat-treated in a water vapor atmosphere at 125° C. for 20 hours.

5. The separation membrane according to claim 1, further comprising a hydrophilic polymer,
   wherein the hydrophilic polymer comprises a copolymer comprising two or more kinds of monomer units, and has a hydration energy density of 40 to 70 cal·mol⁻¹·Å⁻³, provided that the hydration energy density is a total hydration energy of monomer species constituting the copolymer per unit volume.

* * * * *